United States Patent [19]

Schlauch

[11] 4,102,784

[45] Jul. 25, 1978

[54] COLLOID FREE PRECIPITATION OF HEAVY METAL SULFIDES

[76] Inventor: Richard M. Schlauch, 29 Gerard Rd., Yardville, N.J. 08620

[21] Appl. No.: 799,699

[22] Filed: May 23, 1977

Related U.S. Application Data

[63] Continuation-in-part of Ser. No. 680,553, Apr. 27, 1976, abandoned.

[51] Int. Cl.$^2$ ............................................... C02B 1/20
[52] U.S. Cl. ....................................... 210/47; 210/53
[58] Field of Search ....................... 210/49, 52, 53, 47

[56] References Cited

U.S. PATENT DOCUMENTS

| | | | |
|---|---|---|---|
| 3,474,033 | 10/1969 | Stout et al. | 210/52 |
| 3,740,331 | 6/1973 | Anderson et al. | 210/53 |

*Primary Examiner*—Thomas G. Wyse
*Attorney, Agent, or Firm*—Omri M. Behr

[57] ABSTRACT

In an aqueous solution heavy metal pollutant ions are removed as a precipitate formed by adding an insoluble slurry of a metal sulfide salt. The supernatant liquid is free of colloids.

8 Claims, No Drawings

COLLOID FREE PRECIPITATION OF HEAVY METAL SULFIDES

This is a continuation-in-part of application Ser. No. 680,553 filed Apr. 27, 1976 now abandoned.

BACKGROUND OF THE INVENTION

This invention relates to a process for removing heavy metal pollutants from aqueous solutions by precipitation. In U.S. Pat. No. 3,740,331 Anderson et al. describe a method of removing heavy metal pollutants from aqueous solutions. According to said invention, a metal ion such as ferrous that will form a sulfide having a higher equlibrium sulfide ion concentration than the sulfide of the heavy metal pollutant is added to the aqueous solution to form a sulfide precipitate of the pollutant heavy metal. A soluble salt of the heavy metal to be added is dissolved in the solution before the sulfide ion is introduced. The added heavy metal ion then acts as an excess sulfide scavenger when sulfide is added to precipitate the less soluble sulfide and prevents the generation of noxious quantities of hydrogen sulfide and formation of complexes of soluble sulfide ions. In practicing said invention it has been found that although precipitation of the pollutant heavy metal sulfide is substantially quantitatively complete, the formation of colloidal and very finely divided heavy metal sulfides can occur by this method. These finely precipitated and colloidal sulfides make it difficult to separate the precipitated metal from the treated solution by sedimentation and filtration processes.

OBJECTS OF THE INVENTION

The object of this invention is to provide a process of removing heavy metal pollutants from an aqueous solution as a substantially large size precipitate without formation of a colloid.

Another object of the invention is to prepare the precipitant metal sulfide in the absence of the contaminant heavy metal ions.

Yet another object of the invention is to prepare a metal sulfide slurry in a specific manner which would maximize the pollutant ion precipitation.

The advantage of this invention will become apparent upon consideration of the following disclosure:

SUMMARY OF THE INVENTION

In a method of precipitating heavy metal pollutant ions from an aqueous solution by adding a metal sulfide having a higher equilibrium sulfide ion concentration than the sulfide of the heavy metal pollutant, the metal sulfide is added in the form of a slurry. The slurry is prepared in a specific manner to cause large particle size of the precipitate.

DETAILED DESCRIPTION

According to this invention the colloid formation of heavy metal sulfides can be avoided or minimized by slow addition of the solution of ferrous ions to a solution of sulfide ions at a controlled rate in the absence of heavy metal pollutant ions, and adding the resulting slurry of large particle size precipitate of ferrous sulfide to the stream containing the metal pollutants to be removed. The following parameters must be satisfied in order to make this method of sulfide feed work effectively:

1. The ferrous sulfide (FeS) slurry must be prepared in the absence of the contaminant heavy metal ions to prevent the formation of colloidal sulfides of these metals.

2. The sulfide ion must be added to the ferrous sulfide reactor (i.e., slurry tank) before the ferrous ion is added.

3. The sulfide ion solution should be as concentrated as possible at the start of the ferrous sulfide precipitation and ferrous ion solution should therefore be added slowly to the sulfide ion solution.

4. The slurry should be slowly stirred or otherwise agitated at a constant rate during the preparation of the slurry to form large and uniform particles of ferrous sulfide. Approximately 90% of the parties have a diameter of at least 50 microns or over.

5. The pH of the ferrous sulfide slurry should be kept above 7.0 in order to avoid the possible formation of $H_2S$ gas. In the combination of the soluble sulfide salt and soluble ferrous salt, used to prepare the metal sulfide slurry will cause a pH value lower than 7.0 when they are mixed together, then an alkaline pH adjustor, such as lime or caustic soda, should be added to keep the pH above 7.0. The pH adjustor may be added before or after the solution of sulfide ion is added to the slurry tank.

The effect of heating the solution during the precipitation of metal sulfides is known in the art to help increase the size of the precipitates. It has been demonstrated that this invention works well over the range of slurry temperatures between about 13° C and 25° C, and it is expected, that applying heat in addition to maintaining the above requirements will improve the size and/or rate of precipitation. It does not appear to be necessary to apply heat to obtain a satisfactory metal sulfide precipitate if the water used to make the slurry is about 10° C or more. Therefore, this invention should eliminate the necessity of applying heat in most cases.

The choice of the metal sulfide slurry to be added to the solution to be treated depends upon what ions are to be removed from the solution, the use to which the water is to be put after it has been treated and such practical consideration as cost and availability of the various metal salts. Ferrous sulfide slurry is preferred since it can precipitate a greater variety of pollutant ions and is relatively cheaper, but this invention is not limited to that salt only. Practically slurry of any sulfide which is more soluble than the metallic ions which are to be precipitated can be used as a source of sulfide ion.

The following table shows the sulfide ion concentrations for several of the more common heavy metal sulfides as calculated from their solubility products. The values are arranged in descending order of equilibrium sulfide ion concentration.

TABLE I

| Metal ion: | Equilbirum sulfide ion concentration (moles/l.) |
|---|---|
| $Mn++$ | $3.75 \times 10^{-8}$ |
| $Fe++$ | $6.1 \times 10^{-10}$ |
| $Zn++$ | $3.46 \times 10^{-12}$ |
| $Ni++$ | $1.18 \times 10^{-12}$ |
| $Sn++$ | $3.1 \times 10^{-13}$ |
| $Co++$ | $1.73 \times 10^{-13}$ |
| $Pb++$ | $1.84 \times 10^{-14}$ |
| $Cd++$ | $6.0 \times 10^{-15}$ |
| $Ag+$ | $3.4 \times 10^{-17}$ |
| $Bi+++$ | $4.8 \times 10^{-21}$ |
| $Cu++$ | $9.2 \times 10^{-23}$ |
| $Hg++$ | $4.5 \times 10^{-25}$ |

The ferrous sulfide slurry could either be made in a continuous operation or as a batch. In the best mode of operation the slurry is prepared in the following manner although any other suitable method could be employed.

A concentrated solution of a soluble sulfide compound (such as 40% NaHS or $Na_2S$) is measured and fed into a stirring or slurry tank which contains a volume of water greater than the volume of sulfide solution being added. It is also feasible to use a sulfide gas (such as $H_2S$) for this purpose under more controlled conditions. The pH of the water should be adjusted to at least pH 10 or even higher with an alkali such as calcium hydrate or sodium hydroxide in order that; (a) the hydrogen ion concentration of the water is extremely low when the sulfide is added to prevent hydrogen sulfide gas evolution and maintain sulfide ion in solution, (b) sufficient hydroxide ion is present in solution to react with and neutralize all the acidity that will be added when the solution of ferrous salt is added.

When the sulfide solution and pH adjustment chemical has been measured or metered at the desired quantities, and placed in a volume of water in the slurry tank (which will constitute a portion of the final mixing and suspending medium, for example, 10 to 30% of the final volume) the solution is stirred at a moderate rate. The desired stirring should accomplish as rapid as possible motion of the liquid horizontally (i.e., a rapid circular motion of the liquid in vertical cylindrical tank) without encouraging vertical (i.e. bottom to top and top to bottom) mixing or production of waves, vortices or surface disturbances which may promote air entrainment by the liquid. While maintaining this desired stirring a measured or metered quantity of ferrous ion solution (i.e. the stoichiometric amount of ferrous ion required to precipitate all sulfide ion as FeS, plus 5-10% excess ferrous ion) is gradually added slowly enough that it is evenly distributed by the prescribed stirring so that pockets or localized areas of the slurry do not become acidic (i.e., below pH 7) due to poorly distributed ferrous solution. There are two (2) reasons why the sulfide solution and any necessary pH adjustors should be added to the slurry tank first.

1. It was apparent from laboratory tests that the rate of precipitate growth was greatly increased when the concentration of one of reactants (i.e., the sulfide solution) was very high in relation to the other (i.e., the ferrous ion) when the precipitation reaction was initiated.

2. It is easier to keep the pH of the reacting FeS system above pH 7.0 if the starting solution, containing one of the reactants, has the larger volume and is the alkaline solution than if the starting solution is the smaller volume and/or is the acidic solution. If the ferrous solution is used to start with and adjusted with an alkali to pH 7.0 or more, most of the ferrous ion would be precipitated as ferrous hydroxide and the rate of FeS precipitation would be slower than by the desired procedure.

When the reactants have been combined according to the above procedure the slurry of ferrous sulfide precipitate is to be continually agitated with enough suspending fluid (water) to give the desired slurry concentration for feeding to the heavy metal treatment process. Stirring conditions are to be sufficient to evenly suspend the slurry throughout the suspending liquid. Stirring conditions which promote air entrainment by the slurry surface should be minimized to prevent oxidation of FeS. The evenly distributed slurry of FeS precipitate is then pumped, gravity fed, forced from a pressurized vessel or conducted by some other means to the heavy metal pollutant stream entering the treatment process. Stirrer and pump designs that promote mechanical shearing of the precipitate should not be used for making or conducting of the slurry as they reduce the particle size of the slurry. The heavy metal pollutant ions are precipitated in preference to the heavy metal ions such as ferrous added to the solution in a mixing tank. After the reaction the resultant pollutant metal sulfide precipitate is removed by conventional means such as settling, filtration or centrifugation, leaving the effluent liquid colloid free.

The advantages of the process of this invention are apparent from the following examples:

EXAMPLE I

For Cu++ complex removal with FerriFloc (50 ppm) added as coagulant:

1. To 500 ml of tap water added 1.25 ml Standard copper plating solution, pH = 10.2. (20 ppm Cu++)
2. Add 150 ppm (7.5 ml of 1% $Na_2S.7H_2O$) sodium sulfide slowly while stirring, pH = 10.7.
3. Add 184 ppm (9.2 ml of 1% $FeSO_4$—$7H_2O$) very slowly while stirring, pH = 9.9.
4. Add 50 ppm (2.5 ml 1% solution) FerriFloc, pH = 7.5.
5. Adjust pH value to 7.5 to 8.5 with $H_2SO_4$ or Ca($OH)_2$ and note how much chemical is needed. Added 0.5 ml of 5% $H_2SO_4$ pH = 7.9. No settleable floc formed.

EXAMPLE II

For Cu++ complex removal with Alum (50 ppm) added as coagulant:

1. To 500 ml of tap water add 1.25 ml of standard copper plating solution, pH = 10.4.
2. Add 150 ppm (7.5 ml 1% $Na_2S.7H_2O$) sodium sulfide while stirring, pH = 10.8.
3. Add 184 ppm (9.2 ml 1% $FeSO_4.7H_2O$) very slowly while stirring, pH = 10.8.
4. Add 50 ppm (2.5 ml 1% solution) alum slowly, while stirring, pH = 9.5.
5. Adjust pH value to 7.5 to 8.5 with $H_2SO_4$ or Ca($OH)_2$ and note how much is needed. Added 0.8 ml 5% $H_2SO_4$, pH = 6.7. No settleable floc formed.

EXAMPLE III

For C++ complex removal without adding coagulants.

1. to 500 ml of tap water add 150 ppm sodium sulfide slowing while stirring.
2. Add 184 ppm (9.2 ml 1% $FeSO_4.7H_2O$) slowly while stirring.
3. Add 1.25 ml of standard copper plating solution.
4. Add 0.9 ml of 5% $H_2SO_4$ to maintain pH = 7.5 to 8.0.

Floc formed in this sample after ferrous sulfate was added. It settled well and left a relatively clear supernatant within minutes.

Examples 1 and 2 show that when copper was introduced to the system first, no effectively settleable precipitate was formed at all, even though the commonly used inorganic coagulants Ferrifloc, $Fe_2(SO_4)_3$, and Alum, $Al_2(SO_4)_3$ X $18H_2O$, were used to help coagulation. Example 3, however, which had the copper ion added after FeS was precipitated (using sodium sulfide and ferrous sulfate) resulted in a large precipitate that settled quickly and left a clear supernatant.

EXAMPLE IV

Jar Tests for Coagulant Addition

| Jar No. | 1 | 2 | 3 | 4 | 5 | 6 |
|---|---|---|---|---|---|---|
| To 500 ml Tap Water add in order | 20 ppm | →→→→→→→→→→→→→→→→→→→→→→→→→→→→→→→→→→→→→→ | | | | 150 ppm |
| 1 | 1.25 ml Cu solu. | →→→→→→→→→→→→→→→→→→→→→→→→→→→→→→→→→→→→→→ | | | | 7.5 ml Na$_2$S . 9H$_2$O |
| 2 | 0.5 ml 5% H$_2$SO$_4$ 2.5 ml | 0.8 ml 5% H$_2$SO$_4$ 50 ppm | 7.5 ml 150 ppm Na$_2$S | →→→→→→→→→→→→→→→→→→ | | 9.2 ml 184 ppm FeSO$_4$ . 7H$_2$O |
| 3 | 50 ppm Fe$_2$(SO$_4$)$_3$ | 2.5 ml alum | 9.2 ml 184 ppm FeSO$_4$ | →→→→→→→→→→→→→→→→→→ | | 1.25 ml Cu++ solution |
| 4 | 150 ppm Na$_2$S 9.2 ml | →→→→→→→→→→→→→ | | 0.5 ml H$_2$SO$_4$ 2.5 ml | 0.8 ml H$_2$SO$_4$ 2.5 ml | 0.9 ml H$_2$SO$_4$ | 0.9 ml H$_2$SO$_4$ |
| 5 | 185 ppm FeSO$_4$ | →→→→→→→→→→→→→ | | 50 ppm Fe$_2$(SO$_4$)$_3$ | 50 ppm alum | |

Stir fast, mix for 30 seconds after adding all chemicals then slow mix at 25 to 30 rpm for 30 min, let settle and collect top 1 inch supernatant after 1 min settling. Note sludge volume 10 minutes and 30 min. after stopping stirrers.

30 minutes after settling, No. 6 was the only one with settled sludge less that 5 volume %.

| Jars | 1 | 2 | 3 | 4 | 5 | 6 |
|---|---|---|---|---|---|---|
| | no floc | no floc | no floc | no floc | no floc | good floc |
| pH | 8.3 | 7.4 | 7.9 | 7.3 | 7.5 | 7.5 |
| FTU* | meaningless | | | | | |
| apparent color | all highly colored | | | | | about 500 units** |

*FTU = Formazin Turbidity Unit
**ATHA Standard Pt-Co. color units

EXAMPLE V

Jar Test for Checking Necessary Excess Na$_2$S and FeSO$_4$

To 500 ml of Tap Water each jar add

| Jar No | 1 | 2 | 3 | 4 | 5 | 6 |
|---|---|---|---|---|---|---|
| 1 | 3.75 ml Na$_2$S | 7.5 ml Na$_2$S | 11.25 ml Na$_2$S | 15 ml Na$_2$S | 18.75 ml Na$_2$S | 1.125 ml Cu++ solu. |
| 2 | 4.6 ml FeSO$_4$ | 9.2 ml FeSO$_4$ | 13.8 ml FeSO$_4$ | 18.4 ml FeSO$_4$ | 23 ml FeSO$_4$ | 5 ml of Clay |
| 3 | stir 100 rpm for 5 min. | | | | | 7.5 ml Na$_2$S |
| 4 | 1.125 ml Cu++ solu. | | | | | 0.9 ml of 5% H$_2$SO$_4$ |
| 5 | 0.9 ml 5% H$_2$SO$_4$ | | | | | 9.2 ml FeSO$_4$ |

Stir all fast, mix 30 seconds and slow mix 25 to 30 rpm for 30 min.

All have visible floc except No. 6, after 5 to 10 min. stirring. After 30 min. stop stirrers and allow to settle 10 min. Then decant top 100 ml of greenish supernatant for analysis.

| Jars | 1 | 2 | 3 | 4 | 5 | 6 |
|---|---|---|---|---|---|---|
| Sludge Vol. 9 min settling | Greenish Brown ppt less than 10 ml | Black ppt less than 25 ml | Black ppt less than 50 ml | Black ppt less than 50 ml | Black ppt less than 50 ml | Black colloid |

When 0.45 Micron filtered the filtrate analysis of each supernatant shows much of the color is removed.

| Jars | 1 | 2 | 3 | 4 | 5 | 6 |
|---|---|---|---|---|---|---|
| pH | 8.9 | 8.0 | 7.6 | 7.3 | 7.2 | 7.3 |
| Color | 210 | 390 | 370 | est. 650 | est. 700 | est. more than 1000 |
| Cu++* | 8.1 | 6.5 | 4.5 | 1.3 | 0.9 | 2.0 |
| Fe++* | 1.2 | 4.6 | 6.9 | 14 | 19 | 37 |

*0.45 Micron filtered

Color is measured as APHA color units or Potassium Chloro Platinate Units.

Example IV shows that the first five jars (i.e. 1–5) which have had the copper solution added first, did not form a settleable precipitate after 30 minutes of mixing with sodium sulfide and ferrous sulfate. Jar no. 6, which had the copper solution added after the sodium sulfide and ferrous sulfate had reacted, did have a settleable precipitate.

Jar test in the Example V resulted in poor precipitation in the one jar (no. 6) that had copper ion added first, but had better precipitation in those jars that had the copper added after the sodium sulfide and ferrous sulfate solutions were first mixed in. The high color values in the supernatant samples are due (in great part) to dissolved iron and colloidal iron. The high residual iron color is attributed to the incomplete precipitation of FeS that occurred because (a) the sodium sulfide was too dilute when the ferrous sulfate was added and (b) there was insufficient time for complete FeS precipitate growth (less than 1 min.) before the copper ion was added.

The following example shows result of a jar test where the FeS was produced externally to the copper solution by slowly adding a concentrated solution of ferrous sulfate to sodium sulfide under moderate agitation. Then the FeS slurries were added to the copper solutions and stirred. Clear supernatants were produced in all cases after 15 minutes of settling time. FeS slurries were produced externally to the copper solution in the reaction jars because it was desired to keep the concentration of sodium sulfide high when the ferrous sulfate was added to it.

EXAMPLE VI

To test mixing time and excess FeS requirement when sludge blanket contact is used.

Part A — Set up 6-4 liter jars add standard Cu++ complex (20 ppm Cu++) plating waste solution. Make up enough FeS slurried solid to have 2X theoretical Cu++ equivalent in each of three jars and 3X theoretical Cu++ equivalent in the remaining three jars. Agitate for 50 minutes at 40 rpm (after adding 7.2 ml of 5% $H_2SO_4$ to each). Let settle overnight after collecting 20 min. settled supernatant samples and filtering them through 0.45 mu Millipore. Add 0.6 ml 50% $HNO_3$ to each sample to prevent further precipitation and save for Cu++ and Fe analyses.

Part B — Set up 6-0.5 Liter beakers (0.5 liter of sample solution) add standard Cu++ complex plating solution (20 ppm Cu++) to each. Make up enough FeS slurried solid to add 2X their Cu++ equivalent to three beakers and 3X Cu++ equivalent to remaining three beakers. After adding FeS to each beaker while stirring at 35 to 40 rpm, add settled sludge (solids) from Part A of this test so that Part A 2X Cu++ equivalent is added to Part B 2X Cu++ equivalent and Part A 3X Cu++ equivalent is added to Part B 3X Cu++ equivalent. Agitate one 2X Cu equivalent and one 3X Cu equivalent for 15 minutes, one 2X Cu equivalent and one 3X Cu equivalent for 30 min and one 2X Cu equivalent and one 3X Cu equivalent for 60 minutes at 35 to 40 rpm. After agitation let settle for 10–15 min. Filter through 0.45 millimu Millipore and save for Cu++ and Fe analyses.

PART A 4 Liter Samples

JAR NO. 1(2X) 2(2X) 3(2X) 4(3X) 5(3X) 6(3X)

STEP NO. 1 Add 9 ml of standard Cu complex plating solution to each jar for 20 ppm Cu++.

STEP NO. 2 Make up three separate 2X Cu equivalent FeS slurries in 100 ml tap water to add to Jars 1, 2 and 3 and at the same time make three separate 3X Cu equivalent FeS slurried in 100 ml tap water for Jars 4, 5, and 6.

STEP No. 3 Allow FeS slurries to agitate five minutes after adding 60 ml of 10 g/l $Na_2S.9H_2$) followed by 73.5 ml 10 g/l $FeSO_4.7H_2O$ to make slurries 1, 2 and 3 and adding 90 ml of 10 g/l $Na_2S.9H_2O$ followed by 110 ml 10 g/l $FeSO_4.7H_2O$ to make slurries 4, 5 and 6, then adding slurries immediately to assigned jars.

STEP NO. 4 Add 7.2 ml 5% $H_2SO_4$ to each jar and agitate for 50 min. at 40 rpm.

STEP NO. 5 Let solids settle for 15 minutes after stopping stirrers and withdraw 100 ml supernatant from each jar, filter and save for analysis. Supernate looks clear. res. pH 7.5 to 7.7

Let sludge settle overnight.

After settling overnight Jars 1, 2 and 3 have 60 to 80 ml settled sludge and Jars 4, 5 and 6 have 80 to 100 ml settled sludge. There is a layer of grayish-green precipitate covering the black (i.e., faster settling solid) precipitate that settled out during first 15 min of settling.

Decanted supernatant from each of the jars and saved the settled sludge for Part B.

Part A Analysis of Filtered Supernatant

| JAR NO. | 1 | 2 | 3 | 4 | 5 | 6 |
|---|---|---|---|---|---|---|
| Cu++ mg/l | 6.0 | 5.5 | 6.0 | 4.0 | 3.9 | 3.8 |
| Total Fe mg/l | 5.7 | 7.5 | 6.4 | 13.0 | 12.0 | 13.0 |

PART B 0.5 Liter Samples

| JAR NO. | 1 | 2 | 3 | 4 | 5 | 6 |
|---|---|---|---|---|---|---|
| Cu Equiv. | 2X | 2X | 2X | 3X | 3X | 3X |

STEP NO. 1 Add 1.125 ml Standard Cu++ complex plating solution to each beaker (jar).

STEP NO. 2. Make up three separate 2X Cu equivalent FeS slurries in 25 ml tap water to add to Jars 1, 2 and 3 by adding 7.5 ml 10 g/l $Na_2S.9H_2$) followed by 9.2 ml 10 g/l $FeSO_4.7H_2O$ while stirring. At the same time make up three separate 3X Cu equivalent FeS slurries in 25 ml tap water to add to jars 4, 5 and 6 by adding 11.25 ml 10 g/l $Na_2S.9H_2$) followed by 13.8 ml 10 g/l $FeSO_4.7H_2O$ to each while stirring. Continue stirring each of these six slurries for 5 min. at 100 rpm and then, add, as quickly as possible, each FeS slurry to the assigned jar containing Cu++ (20 mg/l) and complexing solutions.

STEP NO. 3 After adding fresh FeS slurries add 0.9 ml 5% $H_2SO_4$ to each jar.

STEP NO. 4 As soon as acid is added add collected sludge from respective jars of Part A to each of the jars in Part B. Stir each jar at a rate of 35 to 40 rpm.

Let settle for 15 min. after stirring is stopped. Decant 100 ml of supernatant and filter thru 0.45 mu Millipore. Save for analysis. Supernate clear.

RESULTS — PART B

| Mixing Time | 15 min. | 30 min. | 60 min. | 10 min. | 30 min. | 60 min. |
|---|---|---|---|---|---|---|
| pH | 7.7 | 7.8 | 7.7 | 7.7 | 7.6 | 7.7 |
| Cu++ | 3.7 | 3.0 | 2.4 | 2.4 | 1.5 | 1.1 |
| Total Fe | 7.5 | 9.6 | 10 | 16 | 14 | 15 |

EXAMPLE VI — Part C

To the liquid and solids remaining in each jar of Part B, test Gendrive 458 guar gum based polyelectrolyte (Reg. TM of General Mills) as coagulant aid

| Jar No | 1 | 2 | 3 | 4 | 5 | 6 |
|---|---|---|---|---|---|---|
| Calculated approx ppm susp. solids of FeS and CuS | 30ppm CuS  27.4 ppm FeS  57.4 ppm susp. | 515 ppm  X9  515 ppm | 515 ppm | 30ppm CuS  2X27.4(55)  85 ppm | 765 ppm | 765 ppm  X9  765.0 ppm |
| ppm Gendriv 458 | 0 | 2 ppm | 5 ppm | 2 ppm | 10 3 ppm | 5 ppm |
| | Stir at 40 rpm for 30 minutes | | | | | |
| Effluent Sample Top 1" after | | | | | | |

-continued

| Jar No | 1 | 2 | 3 | 4 | 5 | 6 |
|---|---|---|---|---|---|---|
| 2min settling FTU | Too High to read more than 500 | 12 | 9.5 | 20 | 14 | 6 |
| settled sludge volume 10 min after stopping stirrers | 120 ml | 50 ml | 70 ml | 80 ml | 75 ml | |

EXAMPLE VII

The following example shows the results of jar test where the concentrated sodium sulfide solution was spiked with a little concentrated ferrous sulfate solution (0.5 ml of 38 g/l/FeSO$_4$.7H$_2$O added to 167 ml of 33 g/l Na$_2$S.9H$_2$O) while agitating and a very large black ferrous sulfide precipitate formed immediately. When this partially precipitated solution, containing the large precipitate, was added to pure water and then had the rest of the FeSO$_4$.7H$_2$O solution slowly added to it, the precipitation was rapid and a clear supernatant resulted.

Jar test to precipitate FeS in presence of clays or in presence of freshly precipitated FeS flocs. No pollutant heavy metal ions such as copper are present. To test clays ordinarily used as weighting agents make up enough FeS solids so that 2 grams of FeS can be suspended in 1 liter of liquid and proceed as follows.

| | 6-1 Liter portions to be tested add 1000 ml of Demineralized Water to Each of Six Jars | | | | | |
|---|---|---|---|---|---|---|
| Jar No | 1 | 2 | 3 | 4 | 5 | 6 |
| a) Stir 100 rpm | | | | | | |
| b) add 1 gram | Colloidal Bentonite | Colloidal Kaolin | Ionac* 1200 | Engelhard X-1685** | None | None |

*TM of Ionac Chemical Co. (coagulating clay)
**TM of Englehard Minerals Co. (coagulating clay)

c. Continue stirring at 100 rpm for 5 minutes d. Add 167 ml of 33 gram/l sodium sulfide to each Jar except jars 5 and 6 where the sodium sulfide solution is spiked with about 0.5 ml of 38 g/l FeSO$_4$.7H$_2$O. When small amount of FeSO$_4$ solution is added to sodium sulfide solution in this way (while agitating) a large flocculant FeS solid formed in the sodium sulfide solution which was then present in the Na$_2$S solution as seeds for further FeS precipitation. Continue stirring at 100 rpm for 1-2 min.

e. Add 167 ml of 38 g/l FeSO$_4$.7H$_2$O to each and continue stirring at 100 rpm for 5 min.

f. Reduce stirring speed to 10-15 rpm. After a few minutes all supernatants appeared rather clear. Jar's no. 2, 3, 5 and 6 appeared to have largest flocs.

g. Continue stirring for 24 hours at 10-15 rpm.

h. After 24 hours stirring stop agitators and measure turbidity of top inch of supernatant.

| Jar No. | 1 | 2 | 3 | 4 | 5 | 6 |
|---|---|---|---|---|---|---|
| Tur. FTU | Too High To Read | THTR | THTR | THTR | THTR | * |
| pH Diluted | 6.5 | 6.7 | 7.0 | 7.0 | 7.2 | 7.2 |

-continued

| Jar No. | 1 | 2 | 3 | 4 | 5 | 6 |
|---|---|---|---|---|---|---|
| Effluent 1:1 FTU | THTR | 30 | 29 | 35 | 29 | |

*Contents were inadvertently removed before turbidity measurement

From further experimentation it has been established that this invention works best when the FeS slurry has 90% of particle size over 50 microns. When the FeS slurry was prepared in the presence of pollutant metal ion according to the teaching of U.S. Pat. No. 3,740,331 the supernatant liquid after filtration had a turbidity value of 300 JTU (Jackson Turbidity Unit). According to my invention when FeS slurry is prepared first and then introduced into the pollutant metal ion aqueous solutions, the supernatant liquid after filtration for removal of the precipitate has the turbidity value of less than 2 JTU.

Tests were run to show that other heavy metal ions, besides copper, will form colloidal sulfides when precipitated with soluble sulfide ions. They were also made to show that addition of the sulfide as a sparingly soluble metal sulfide slurry, such as iron sulfide avoids the formation of these colloids. The tests were conducted in a Precipitator which is an upflow solids contact reactor-clarifier vessel divided into two distinct compartments connected by a port area such that reactants and mixing conditions in one zone are not transmitted to adjacent settling zones. The equipment promotes precipitation by ample agitation of reactants and seeding by previously formed precipitates.

The metals used in these tests were copper, zinc, nickel and lead. The concentration of each metal added to the Precipitator influent was maintained so that when 100 mg/l of ferrous sulfide was added, it was approximately 5 times the stoichiometric requirement. In this way, the concentration of suspended material resulting from the precipitation reactions was about the same in every case. In addition to adding the ferrous and sulfide salts, lime was added to maintain the pH value in the 7.5 to 8.5 pH range. A guar gum polyelectrolyte, at 4 mg/l was added in each case to aid flocculation. The heavy metals in this test were each first precipitated by the process of Anderson et al. according to U.S. Pat. No. 3,740,331, and later by the applicant's method i.e., preparing the ferrous sulfide slurry first and then adding it to the corresponding heavy metal ions.

The results of these tests are shown in Table II, for the quality of the effluent produced by both methods for each metal. These results are averages from the data recorded. The results show that the clarity of the effluent by applicant's method is substantially of higher value than that of the Anderson et al method, for each respective heavy metal tested. The clarity is given in terms of percent light transmittance. This measures the quantity of light that passes through a sample from a light source. The more colloidal material present (i.e., the more dispersed the solid phase in the liquid), the lower the transmittance value is. Turbidity was also measured but that was done only to aid in the comparison. Turbidity values cannot be used alone to show a good relationship to the concentration of dispersed colloid in this case. Since these precipitates tend to be very dark in color (i.e. brown to black), they absorb a lot of light and can give a false indication of low suspended solids. Turbidity is actually a measure of reflected light and increases with the amount of light reflected by a sample. Increases in turbidity normally indicates increases in suspended solids (i.e. higher turbidity) when the suspended solids are light in color (i.e. the color of most clays is light). The total suspended solids (TSS) was also measured but also is not offered, by itself, as an indication of colloid concentration since suspended solids can be present in sizes larger than colloidal dimensions. However, in most cases the suspended solids are substantially lower by the applicants method than for the Anderson et al method. This indicates the metal sulfides in the Anderson et al method did not form into settleable size particles (i.e. did not grow large enough) as well, as by the applicant's method.

TABLE II

| | Effluent Quality, Anderson et al (U.S. 3,740,331) Method Compared to Applicant's Method | | | | | |
|---|---|---|---|---|---|---|
| | Anderson et al Method | | | Applicants Method | | |
| Metal Precipitated | AVG. Tur. FTU | TSS mg/l | % Light* Trans. | AVG. Tur. FTU | TSS mg/l | % Light* Trans |
| Copper | 4.5 | 4.8 | 64 | 3.2 | 5.0 | 91 |
| Zinc | 4.1 | 7.2 | 78 | 1.3 | 1.7 | 94 |
| Nickel | 6.3 | 11.6 | 90 | 1.4 | 3.3 | 94 |
| Lead | 5.9 | 7.3 | 73 | 3.5 | 1.8 | 97 |

*Percent light transmittance - as measured on a Hach DR-E1 Colorimeter with a #4445 light filter. Filtered - Deionized well water measured 96 to 100% transmittance on this meter.
TSS - Total Suspended Solids - using a glass fiber filter with Gooch Crucible for gravimetric determination
FTU - Turbidity in Formazin Turbidity Units as measured on a Hach 1860 A turbidimeter.

These comparison results thus demonstrate the improved results obtained by the applicant's process over that of Anderson et al (U.S. Pat. No. 3,740,331).

While the invention has been described in connection with specific embodiments thereof, it will be understood that it is capable of further modification and this application is intended to cover any variation, uses or adaptation of the invention. It will, therefore, be recognized that the invention is not to be considered as limited to the precise embodiments shown and described but is to be interpreted as broadly as permitted by the appended claims.

I claim:
1. A method of precipitating heavy metal pollutant ions from aqueous solution, comprising:
   (a) forming an aqueous solution of a water soluble sulfide;
   (b) adding a water soluble ferrous salt in the presence of sufficient base to maintain the pH above 7 thru the entire precipitating process, to the thus formed sulfide solution, to form a large particle size slurry of ferrous sulfide precipitate having a higher equilibrium sulfide ion concentration than the sulfide of the heavy metal pollutant in said aqueous solution;
   (c) adding said slurry of (b) in the presence of a polyelectrolyte, to the aqueous solution containing dissolved heavy metal pollutant ions to form a colloid free metal ion precipitate;
   (d) removing said precipitate.
2. A method of claim 1, wherein the heavy metal pollutant ion is bivalent.
3. A method of claim 2 wherein the bivalent heavy metal is selected from the group consisting of copper, zinc, nickel and lead.
4. The method of claim 1 where the particle diameter of 90% of slurry is at least 50 microns.
5. The method of claim 1 wherein the step (b) the metal salt is added slowly to the sulfide solution and stirred at a controlled rate.
6. The method of claim 1 where the temperature of the slurry is maintained between 13°–25° C.
7. The method of claim 1 wherein the step (b) the ferrous salt added to the sulfide is up to 10% in excess of stoichiometric amount required to precipitate sulfide ion.
8. The method of claim 1 wherein the step (c) the slurry is added slowly to the aqueous solution so as not to shear down its particle size.

* * * * *